No. 703,265. Patented June 24, 1902.
I. HULTMAN & A. M. JOHANSON.
INK FEEDER FOR PENS.
(Application filed Dec. 30, 1901.)
(No Model.)

Witnesses
Jas. A. S. Koehl.
C. B. Hunt

Inventors
Ivar Hultman
A. M. Johanson
By H. B. Willson & Co.
Attorneys

UNITED STATES PATENT OFFICE.

IVAR HULTMAN AND ADOLF MAGNUS JOHANSON, OF STOCKHOLM, SWEDEN.

INK-FEEDER FOR PENS.

SPECIFICATION forming part of Letters Patent No. 703,265, dated June 24, 1902.

Application filed December 30, 1901. Serial No. 87,824. (No model.)

*To all whom it may concern:*

Be it known that we, IVAR HULTMAN and ADOLF MAGNUS JOHANSON, of Stockholm, in the Kingdom of Sweden, have invented certain new and useful Improvements in Ink-Feeders for Pens, of which the following is a specification.

Our invention has relation to improvements in ink-feeders for pens; and it consists in the construction and arrangement of parts, as will be hereinafter described, and particularly pointed out in the claim.

Figure 1:
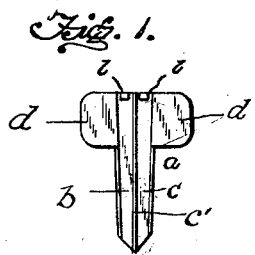
Figure 2:
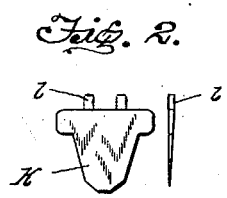
Figure 3:
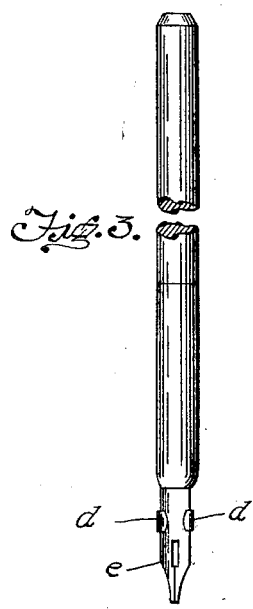
Figure 4:
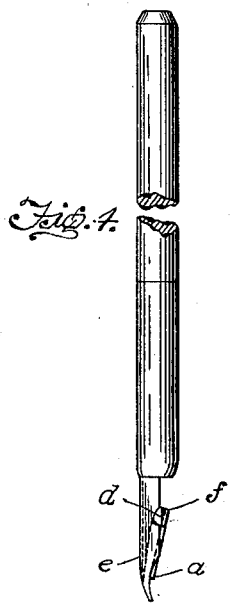

In the accompanying drawings, Figure 1 is a view of the ink-feeder ready to be attached to the pen. Fig. 2 shows a plan view and from the edge a blank of sheet metal from which the feeder may be made by folding. Figs. 3 and 4 show penholders with pen and ink-feeder seen from above and from the left side.

The ink-feeder is wedge-shaped and has two channels $b$ and $c$, which are open at both ends. An intervening groove $c'$ is formed between the channels. The hooks or clamps $d$, projecting sidewise at the rear upper end of the feeder, form an angle with the latter when seen from the side, in order to keep the front end in contact with the pen, as shown in Fig. 3. The width and depth of the channels may successively increase backward, and, besides, a backward-increasing space $f$ may be felt between the pen and the feeder, so as to afford an ink-pocket of not too small a capacity. When using the pen, the ink is automatically fed from this pocket through the front mouth of the channels to the nib of the pen.

On pens of the form shown and on many other kinds of pens, the feeder may be applied by passing it over the pen from behind and then moving it forward to its proper position. As the width of the pen generally increases a little toward the front end, the feeder when moved forward will thus be more firmly kept in place on the pen.

The clamps $d$ are preferably bent into their funnel shape by manufacturing the feeder so that the feeder is ready to be passed over the pen. If the feeder in such state does not exactly correspond with the width of the pen, it may be easily adjusted by the user by simply pressing the feeder a little together when it is too wide, or by slightly relaxing the folds when too narrow, or the feeder may be brought into the market with unfolded clamps, as shown in Fig. 1, and the user may fold them himself by placing the feeder in the concavity of the pen and then turning the laps $d$ over the edges of the pen. In such cases the feeder is preferably made of thin sheet metal, so that it can be bent by the finger without the aid of instruments, or the feeder may be applied to the pen at the works of the factory in any suitable way, if preferred.

In Fig. 1 we have shown the channels of the feeder partly closed at the rear end by means of laps $l$, whereby the flow of ink is prevented from having a backward movement above the channels.

It is obvious that the feeder may have more than two clamps engaging the side edges of the pen. It is also obvious that the feeder may be sold separately or attached to the pen.

Having thus described our invention, what we claim, and desire to secure by Letters Patent, is—

An ink-feeder having continuous longitudinal channels with a terminal wedge-shaped lower end, an intervening groove between the channels, adjustable clamps on the upper portions of the channels, and laps for partially closing the upper ends of said channels, substantially as specified.

In testimony whereof we have hereunto set our hands in presence of two subscribing witnesses.

IVAR HULTMAN.
ADOLF MAGNUS JOHANSON.

Witnesses:
L. ROWELL,
OSKAR RINGSTROM.